United States Patent [19]

Courbot

[11] 4,200,176
[45] Apr. 29, 1980

[54] CLUTCH ASSEMBLY

[75] Inventor: Pierre Courbot, Villiers le Bel, France

[73] Assignee: Société Anonyme DBA, Paris, France

[21] Appl. No.: 863,271

[22] Filed: Dec. 22, 1977

[30] Foreign Application Priority Data

Jan. 7, 1977 [FR] France .................. 77 00331

[51] Int. Cl.² ............................. F16D 13/44
[52] U.S. Cl. .......................... 192/89 B; 192/70.3
[58] Field of Search ............. 192/89 B, 70.27, 70.29, 192/70.3

[56] References Cited

U.S. PATENT DOCUMENTS

| | | | |
|---|---|---|---|
| 2,138,169 | 11/1938 | Hunt | 192/70.27 |
| 3,300,007 | 1/1967 | Motsch | 192/89 B |
| 4,084,674 | 4/1978 | deGennes | 192/89 B |

Primary Examiner—C. J. Husar
Assistant Examiner—David C. Reichard
Attorney, Agent, or Firm—Paul David Schoenle; Ken C. Decker

[57] ABSTRACT

A clutch assembly comprising an annular cover, a pressure plate rotationally connected to said cover, a resilient annular diaphragm, and an annular element pivotably connecting said diaphragm to said cover. Tha annular element is provided with a radially extending annular portion which resiliently engages the diaphragm and with axially extending circumferentially spaced tabs which project through facing apertures in the diaphragm and in the cover. Each tab carries a resilient lug capable to be housed in an opening in the tab during installation of the element, the free end of said lug normally engaging the cover after predetermined axial stressing of the annular portion of the annular member after installation of the latter.

7 Claims, 4 Drawing Figures

CLUTCH ASSEMBLY

The invention relates to a clutch assembly suitable for a motor vehicle and to a clutch comprising such an assembly.

More particularly, the invention relates to a clutch assembly of the type comprising an annular cover rotationally connected to a pressure plate and capable of being fixed by its outer periphery to a flywheel, and a resilient annular diaphragm comprising an outer peripheral portion and a central portion formed of radial fingers which are separated by open slots and which are capable of being axially stressed by operating means so as to shift the pressure plate axially away from the flywheel, fulcrum means being provided between the diaphragm and the cover, the fulcrum means comprising an annular element having an annular portion bearing on that face of either of the members constituted by the cover and by the diaphragm which is remote from the other of the said members, tabs extending axially from the annular portion through apertures facing them in the diaphragm and cover respectively.

After a clutch assembly of this type has been in use for a relatively short period, the diaphragm installation causes wear of the contact surfaces on the diaphragm, on the cover and on the annular member constituting the fulcrum means. The principal result of this wear is that play appears between the diaphragm and its supports. To prevent this play from occurring, it has been known for a resilient element to be placed between the tabs of the annular element and the housing. It is also known for the tabs of the annular element to be crimped on to the housing so that the annular portion of this element is resiliently stressed.

While these two solutions overcome the disadvantage mentioned above by ensuring permanent contact between the diaphragm and its supports, they have the disadvantage that the installation of the annular element, possibly accompanied by a resilient element, is relatively difficult and demands the use of fairly complicated equipment. This is because the initial tension which must be applied to the annular portion of the annular element must be accurately determined, allowing for the resilient force applied by the diaphragm, for the possibility of the diaphragm pivoting on its supports, and for the play to be taken up in the course of the life of the clutch. Consequently the tabs must be crimped very accurately, rendering installation very difficult.

An object of the invention is to overcome the disadvantages inherent in the known clutch assemblies while preserving the advantages of the solutions already mentioned.

To this end, a clutch assembly of the type defined above is characterized in that each tab defines at least one axial abutment capable of retracting during installation so as to engage that face of the other member remote from the first member after predetermined axial stressing of the annular portion and/or of the axial abutments formed on the said annular element.

With such a feature, the initial tension applied to the annular portion of the annular element and/or to the axial abutments can be established very accurately when this element is manufactured. Also, installation is greatly facilitated, being performed merely by clipping on the annular element, an easy operation because the abutments on the tabs are resilient in a radial direction and can therefore retract readily during installation.

According to another feature of the invention, each abutment may be formed on a lug projecting from the tab which bears it, the lug being capable of being housed in a opening in the tab during installation of the annular element.

The invention also relates to a clutch which more particularly comprises an assembly of this kind.

A particular embodiment of the invention will now be described by way of example only with reference to the accompanying drawings, in which.

Figure 1:
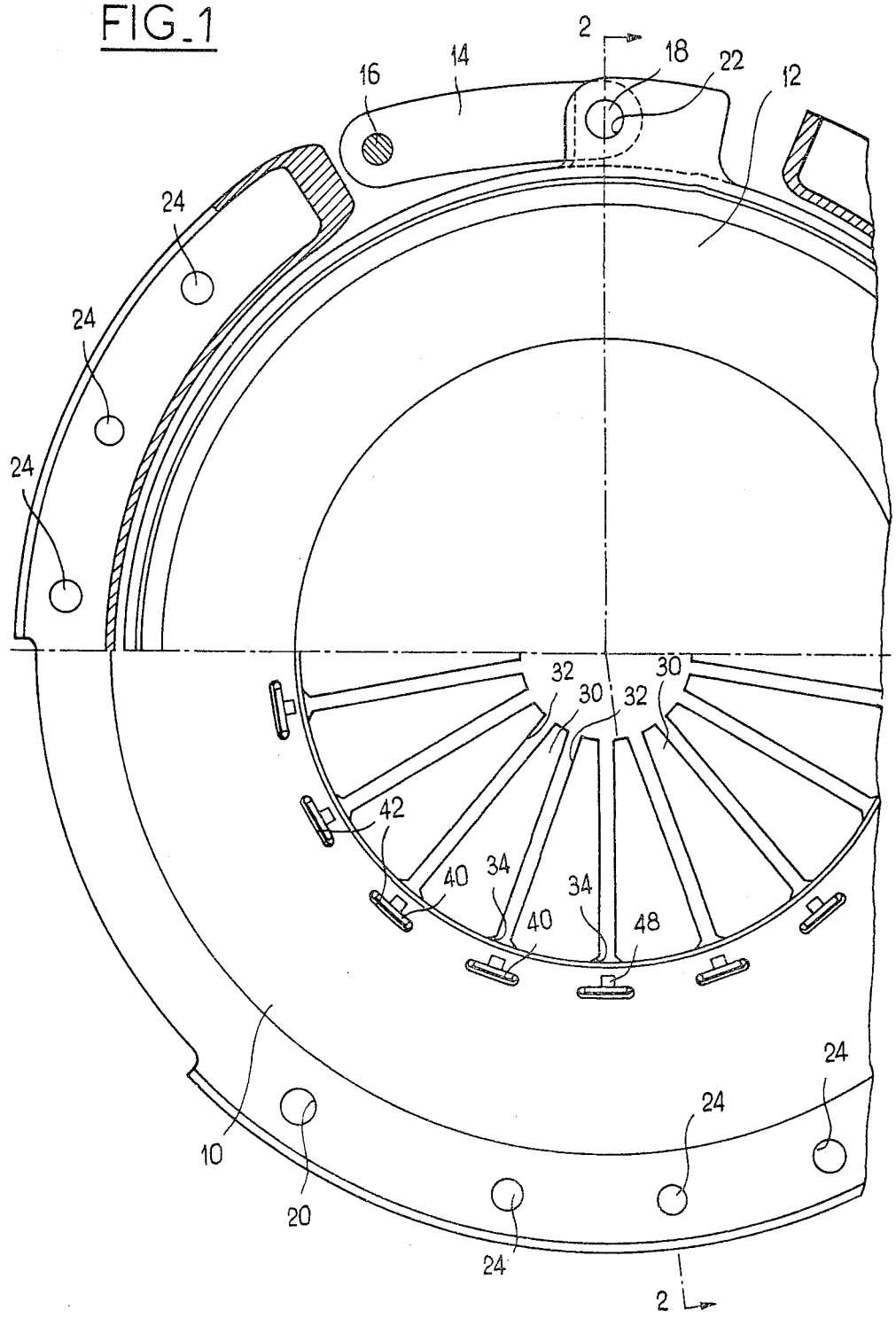
FIG. 1 is an elevation of a clutch assembly embodying the invention, the upper portion being shown in section.
Figure 2:
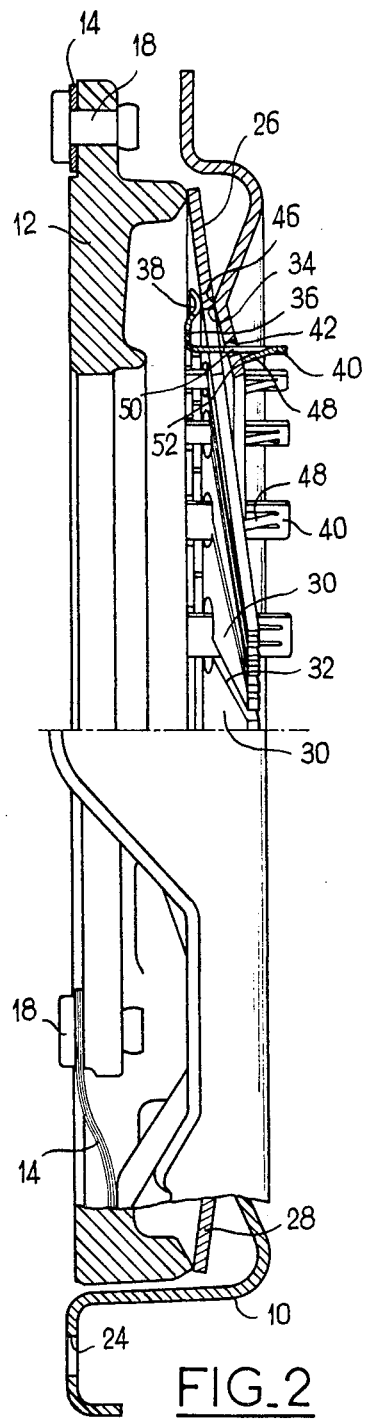
FIG. 2 represents an axial section through this assembly along a line 2—2 in FIG. 1.

The clutch assembly illustrated in FIGS. 1 and 2 comprises an annular cover 10 rotationally connected to a pressure plate 12 by resilient tongues 14, of which only one is shown and which extend in a substantially circumferential direction between rivets 16, 18 or the like, which pass through respective holes 20, 22 in the cover 10 and pressure plate 12. The tongues 14 permit some axial motion of the pressure plate 12 relative to a flywheel (not shown) designed to be fixed to the cover 10 by rivets or the like (not shown) passing through holes 24 in the cover.

The pressure plate 12 is normally urged axially towards the flywheel (not shown) by a diaphragm 26 in order to clamp a driven plate (not shown), which is interposed between the pressure plate and flywheel and is movable axially relative to them.

The diaphragm 26 is resilient and annular and consists principally of an outer peripheral portion 28, the edge of which is in contact with the pressure plate 12, and of a central portion formed of radial fingers 30 separated by open slots 32 which end in substantially circular apertures 34 at the inner periphery of the portion 28 of the diaphragm.

Operating means (not shown), comprising a conventional clutch thrust bearing, can urge the ends of the fingers 30 axially to the left in FIG. 2 to move the pressure plate 12 away from the flywheel (not shown).

To enable the thrust exerted by the operating means on the fingers 30 of the diaphragm 26 to be transmitted to the pressure plate 12, it is customary to provide, between the diaphragm and the cover 10, fulcrum means situated approximately level with the aperture 34 in the diaphragm.

Figure 4:
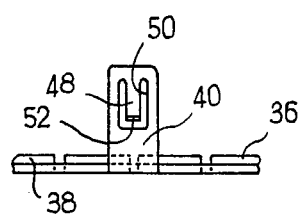
FIG. 4 is a radial view of this annular element in the direction of an arrow 4 in FIG. 3.
Figure 3:
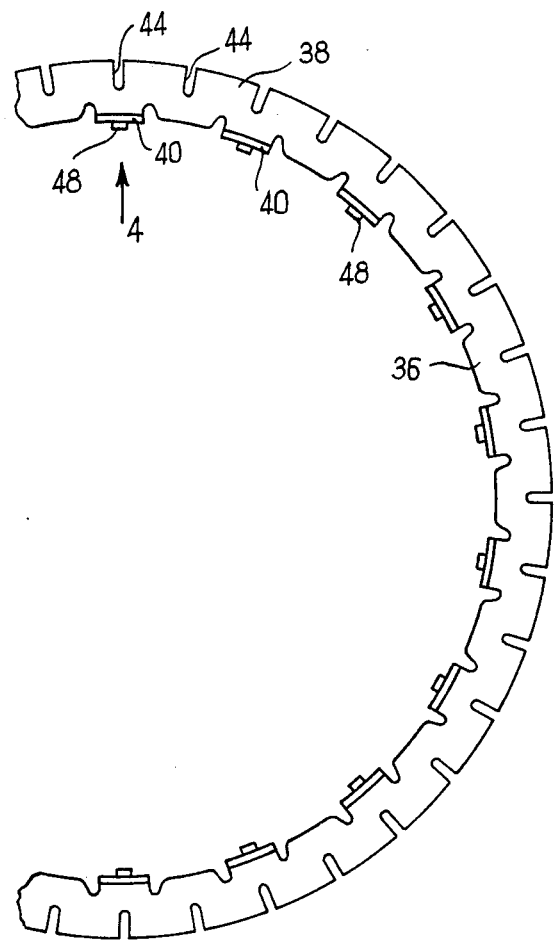
FIG. 3 is an elevation of an annular fulcrum element for the diaphragm in the clutch assembly illustrated in FIGS. 1 and 2.

In accordance with the invention, the fulcrum means comprise an annular element 36 (shown in part in FIGS. 3 and 4) having a resilient annular portion 38 which has a rounded cross-section best shown in FIG. (2) and which bears on that face of the diaphragm 26 remote from the cover 10. The annular element 36 also comprises tabs 40 which extend axially from the portion 38 through the apertures 34 in the diaphragm 26 and through apertures in the form of slots 42 in the cover 10. The annular element 36 is a metal ring of which the cross-section in the vicinity of the tabs 40 is substantially L-shaped. The rounded resilient portion 38 of the annular element 36 extends substantially radially outwards, and it is divided up by a plurality of open, circumferentially spaced slots 44 which lead to the outer edge of the portion 38 and therefore give the latter some axial flexibility, enabling it to compensate for any variation in the distance separating the cover 10 from the pressure plate 12 around the periphery of these two members. As will be seen below, the rounded resilient portion 38 is initially stressed to urge the diaphragm 26 on to a rounded portion 46 or the cover 10, this portion 46 facing the portion 38 of the annular element 36.

The tabs 40 are circumferentially spaced and extend substantially tangentially from the inner peripheral edge of the portion 38 of the annular element 36, to define substantially plane rectangles. In the embodiment illustrated, moreover, the number of tabs 40 is the same as the number of apertures 34, that is, there are as many tabs 40 as there are slots 32 in the diaphragm 26.

In accordance with the invention, each tab 40 bears a lug 48 comprising a substantially rectangular portion punched and bent radially inwards relative to the tab bearing it, to define in the tab an opening 50 at least as large as the lug 48. Each lug 48 starts in the vicinity of the free end of the tabs 40 bearing it and extends axially towards the rounded portion 38 of the element 36, moving slightly away from the tab 40 so that its free end defines an axially fixed abutment 52 capable of retracting into the associated opening 50 during installation of the element 36, before it engages that face of the cover 10 remote from the diaphragm 26. The lugs 48, which are resilient radially relative to the rounded portion 38, are designed to define, before installation, the axial stress which will be applied to the rounded portion 38 when the abutments 52 on the ends of the lugs 48 engage that face of the cover 10 remote from the diaphragm 26 after installation of the annular element 36.

It will be appreciated that a design of this kind can prevent the appearance of play between the diaphragm 26 and cover 10 in the vicinity of the fulcrum means, since such play is taken up automatically by the initial tension stored in the rounded portion 38 of the element 36 during installation. Moreover, this initial tension can be accurately predetermined prior to installation, during the manufacture of the element 36, since it is in fact dependent on the axial distance separating the abutments 52 from the rounded portion 38. Lastly, a design of this kind greatly facilitates installation of the diaphragm 26 in the housing 10, for this is done simply by clipping the annular element 36 on to the two members, before the latter are attached to the pressure plate 12 and to the flywheel (not shown).

The operation of the clutch assembly just described is the same as that of conventional clutches of this type and may be summarized as follows.

When the various components of the assembly are idle, they occupy the positions shown in FIGS. 1 and 2. When the assembly is attached to the rest of the clutch, initial tension is imparted to the diaphragm so that it occupies a substantially plane position when the clutch is engaged. The diaphragm 26 then acts as a spring and urges the pressure plate 12 axially towards the flywheel (not shown), so connecting the pressure plate and flywheel rotationally to an axially movable driven plate (not shown) situated between them. When the driver of the vehicle wishes to declutch, he operates the clutch pedal, causing the inner peripheral portions of the fingers 30 of the diaphragm 26 to be urged to the left in FIG. 2 by way of a clutch thrust bearing (not shown). Because the base of the outer peripheral portion 28 of the diaphragm is pivotably supported between the portion 38 of the annular element 36 and the portion 46 of the cover 10, the outer peripheral portion of the diaphragm portion 28 is urged to the right in FIG. 2, with the result that the pressure plate 12 moves away from the flywheel, so that the frictional engagement between the pressure plate, driven plate and flywheel is at least partly released and the mechanism is at least partly disengaged. When the driver of the vehicle releases the clutch pedal, the clutch release bearing (not shown) is moved back to the right in FIG. 2, so that the various components resume their engaged positions under the influence of the resilience stored in the diaphragm 26, which then acts in much the same way as a Belleville spring washer.

It will be appreciated that the invention is not restricted to the embodiment just described by way of example. In particular, the form and function of the annular portion and of the abutments formed on the annular element may be modified and even inverted without exceeding the scope of the invention. For example, a plurality of abutments may be formed on each tab, and these abutments may equally well be resilient in an axial direction, in which case the annular portion need no longer be axially resilient. Similarly, retraction of the abutment during installation may be due not to movement of each abutment relative to its tab, but to a change in the diameter of the annular element as a whole, in which case the latter is open and has some axial resilience and the apertures in the diaphragm and cover admit the tabs and their abutments. Also, the annular element may be not a metal ring but, for example, wire bent to form the tabs and the annular portion. Furthermore, the annular element could be reversed compared with the element 36 in the embodiment described: the abutments on the lugs could engage the diaphragm whereas the rounded portion of the element would engage the cover. Similarly, the number and special shape of the tabs and of the abutments on them are not restricted to those described. Lastly, the slots in the rounded portion of the annular element are not essential to the invention, and in any case their number and shape may be modified.

What we claim is:

1. A clutch assembly comprising:
    a pressure plate;
    an annular cover rotationally connected to the pressure plate and capable of being fixed by its outer periphery to a flywheel;
    a resilient annular diaphragm comprising an outer peripheral portion and a central portion formed of radial fingers which are separated by open slots and which are capable of being axially stressed by operating means so as to shift the pressure plate axially away from the flywheel;
    fulcrum means provided between the diaphragm and the cover to pivotably mount said diaphragm on said cover;
    said fulcrum means comprising an annular element having an annular portion bearing on that face of the diaphragm which is remote from the cover, and tabs extending axially from said annular portion through apertures facing them in the diaphragm and cover;
    each said tabs defining at least one axial abutment capable of retracting resiliently during installation so as to engage that face of the cover remote from the diaphragm after predetermined axial stressing of the annular element;

a resilient lug projecting from each tab to define said abutments; and an opening provided in each tab and capable to house the corresponding lug during installation of the annular element.

2. A clutch assembly according to claim 1, wherein the annular element comprises a metal ring, each lug comprising a punched and bent portion of the tab which bears it so as to define in the tab the opening for receiving the lug during installation.

3. A clutch assembly according to claim 2, wherein each lug starts near the free end of the tab bearing it and extends towards the annular portion and radially inwards away from the tab so as to define the abutment at its free end.

4. A clutch assembly comprising:

a pressure plate;

an annular cover rotationally connected to the pressure plate and capable of being fixed by its outer periphery to a flywheel;

a resilient annular diaphragm comprising an outer peripheral portion and a central portion formed of radial fingers which are separated by open slots and which are capable of being axially stressed by operating means so as to shift the pressure plate axially away from the flywheel;

fulcrum means provided between the diaphragm and the cover to pivotably mount said diaphragm on said cover;

said fulcrum means comprising an annular element having an annular portion bearing on that face of the diaphragm which is remote from the cover, and tabs extending axially from said annular portion through apertures facing them in the diaphragm and cover;

each said tabs defining at least one axial abutment capable of retracting resiliently during installation so as to engage that face of the cover remote from the diaphragm after predetermined axial stressing of the annular element;

the annular portion of the annular element extends substantially radially and defines inner and outer peripheral edges, the tabs being substantially rectangular in shape and extending axially from said inner peripheral edge through said apertures in the diaphragm and cover to define free ends facing that face of the cover remote from the diaphragm, a resilient lug projecting from said free end of each tab toward said face of the cover and radially inward away from the corresponding tab so as to define at its free end said axial abutment adapted to engage said face of the cover after predetermined axial stressing of the annular element; and a rectangular opening is provided in each tab to house the corresponding lug during installation of the annular element.

5. A clutch assembly according to claim 4, wherein the annular portion of the annular element is resilient and adapted to accomodate said predetermined axial stressing of the annular element after installation of the latter.

6. A clutch assembly according to claim 4, wherein said apertures in the cover are substantially rectangular slots having their larger dimension running in a tangential direction relative to the cover.

7. A clutch assembly comprising:

a pressure plate;

an annular cover rotationally connected to the pressure plate and capable of being fixed by its outer periphery to a flywheel;

a resilient annular diaphragm comprising an outer peripheral portion and a central portion formed of radial fingers which are separated by open slots and which are capable of being axially stressed by operating means so as to shift the pressure plate axially away from the flywheel;

fulcrum means provided between the diaphragm and the cover to pivotably mount said diaphragm on said cover;

said fulcrum means comprising an annular element having an annular portion bearing on that face of the diaphragm which is remote from the cover, and tabs extending axially from said annular portion through apertures facing them in the diaphragm and cover;

each said tabs defining at least one axial abutment capable of retracting resiliently during installation so as to engage that face of the cover remote from the diaphragm after predetermined axial stressing of the annular element;

the annular portion of the annular element extends substantially radially and defines inner and outer peripheral edges, the tabs being substantially rectangular in shape and extending axially from said inner peripheral edge through said apertures in the diaphragm and cover to define free ends facing that face of the cover remote from the diaphragm, a resilient lug projecting from said free end of each tab toward said face of the cover and radially inward away from the corresponding tab so as to define at its free end said axial abutment adapted to engage said face of the cover after predetermined axial stressing of the annular element;

the outer peripheral edge of the annular portion of the annular element being provided with circumferentially spaced open slots.

* * * * *